United States Patent [19]
Fineman

[11] 3,765,172
[45] Oct. 16, 1973

[54] MEANS FOR CONTROLLING OPERATION OF FLUID-PRESSURE OPERATED BOOSTERS

[75] Inventor: Harold Fineman, Birmingham, England

[73] Assignee: Girling Limited, Birmingham, England

[22] Filed: Feb. 11, 1972

[21] Appl. No.: 225,538

[30] Foreign Application Priority Data
Feb. 25, 1971   Great Britain ................... 5,471/71

[52] U.S. Cl.....60/545 P, 91/359, 91/363 R, 60/547
[51] Int. Cl. ....................... F15b 13/16, F15b 9/03
[58] Field of Search ...................... 91/363 R, 363 A, 91/361, 359; 60/54.5 P, 54.6 P

[56] References Cited
UNITED STATES PATENTS

| | | | |
|---|---|---|---|
| 3,452,645 | 7/1969 | Barltrop............................ | 91/363 A |
| 2,865,337 | 12/1958 | Dennis et al..................... | 91/363 R |
| 3,106,873 | 10/1963 | Cripe............................... | 60/54.6 P |
| 3,568,572 | 3/1971 | Steinmetz ............................ | 91/361 |
| 2,964,059 | 12/1960 | Geyer................................. | 91/363 R |
| 3,125,856 | 3/1964 | Branson et al.................... | 91/363 R |

FOREIGN PATENTS OR APPLICATIONS

| | | | |
|---|---|---|---|
| 1,332,700 | 7/1962 | France.............................. | 91/363 R |

Primary Examiner—Martin P. Schwadron
Assistant Examiner—A. M. Zupcic
Attorney—Dwight H. Smiley et al.

[57]         ABSTRACT

Means for controlling operation of a fluid-pressure operated booster for a braking system comprising an electrically operated actuator valve energised by the output from an electronic control module. The control module compares signals from first and second force sensitive means adapted to sense respectively forces acting at any one time on an input member acting on a movable wall of the booster and on an output member on which the movable wall acts to augment a force applied to the input member.

10 Claims, 1 Drawing Figure

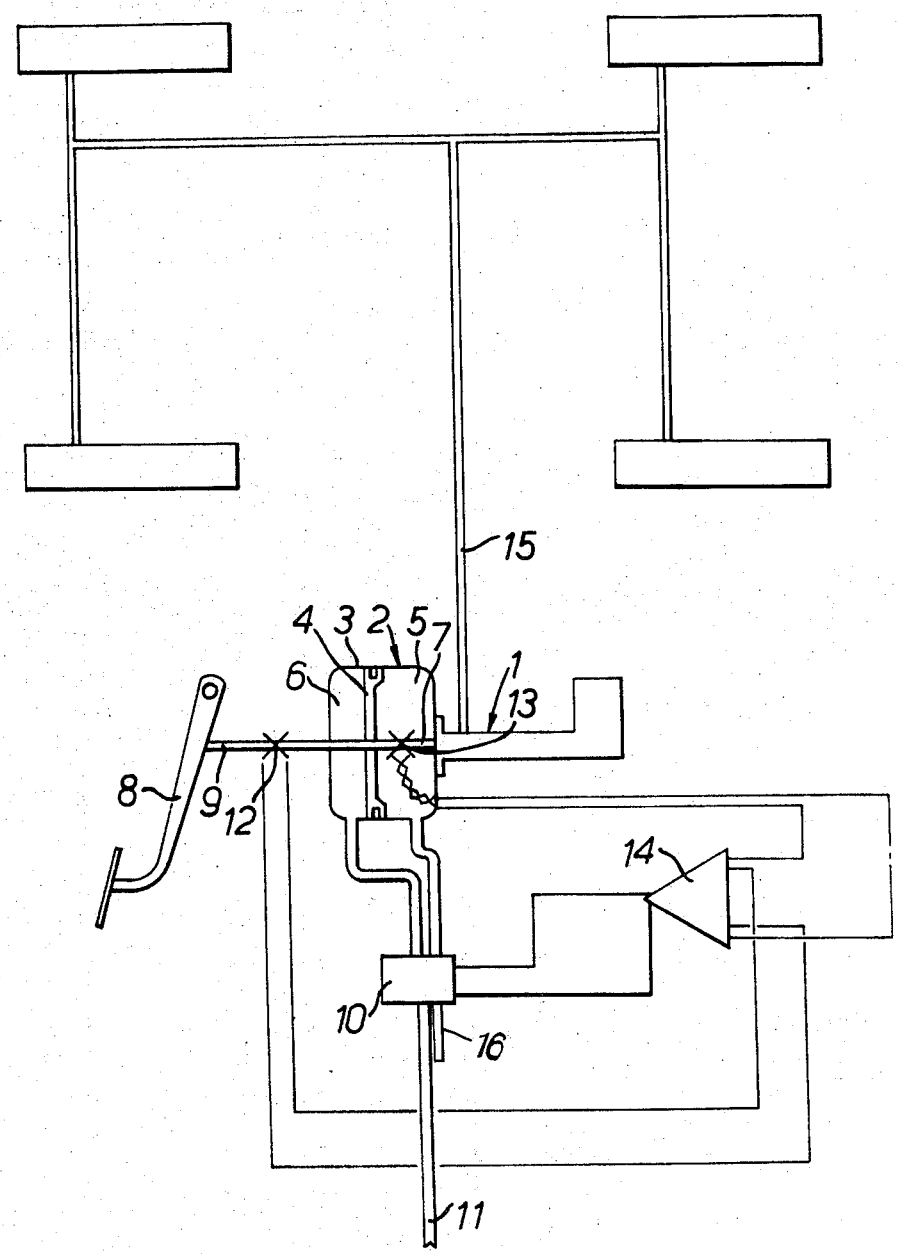

MEANS FOR CONTROLLING OPERATION OF FLUID-PRESSURE OPERATED BOOSTERS

This invention relates to improvements in means for controlling operation of fluid-pressure operated boosters for use in braking systems of the kind in which a movable wall in a housing is adapted to be subjected on opposite sides to differential fluid pressures so that the wall is advanced in the housing and an output force applied to an output member by the movable wall, in response to an input force acting on the movable wall through an input member, is of a magnitude greater than that of the input force and is adapted to be applied to brake applying means, for example an hydraulic master cylinder.

According to our invention operation of a booster of the kind set forth is adapted to be controlled by an electrically operated actuator valve energised by the output from an electronic control module which compares signals from first and second force sensitive means adapted to sense respectively the forces acting at any one time on the input and output members.

The actuator valve is energised to operate the booster when the difference between signals emitted by the first and second force sensitive means exceeds a predetermined value.

Preferably each force sensitive means comprises at least one load cell having an electrical resistance characteristic which is adapted to change in response to a mechanical load applied to the member with which that load cell is associated. Normally the mechanical load will be applied to the member axially in a direction to compress or extend the member, and the change in the electrical characteristic of the load cell will occur as that member is shunted past the load cell.

The electronic control module is adapted to compare the relative changes in the electrical resistance characteristics of the first and second force sensitive means and, as a result, switch out a neutral (in balance) potential to a positive or negative potential to energize the electrically operated actuator valve. Alternatively the control module may emit an A.C. output to energise the electrically operated actuator valve.

The electronic control module also establishes electronically between the first and second force sensitive means, a load sensitive ratio which determines an electro-magnetic equivalent of the boost ratio of the booster, that is to say a ratio at which the electronic control module will energise the actuator valve.

Conveniently the electronic control module may also establish electronically between the load cells, a degree of mis-match in the sensitivities of the load cells to maintain limits within the actuator valve will not be energised by the control module.

Alternatively or in addition manually operable means may be incorporated for determining the boost ratio of the booster and for determining the limits within which the actuator valve will not be energised by the control module.

The electrically operated actuator valve is operative to control the development of the fluid-pressure differential on opposite sides of the movable wall by isolating chambers on opposite sides of the movable wall which are normally subjected to equal pressures and by admitting into one chamber of which the effective volume is variable a supply of fluid at a pressure different from that to which the chambers are normally subjected. For example, in an inoperative "balanced" condition when the chambers are normally subjected to a supply of vacuum or to air under pressure atmospheric air is introduced into the said one chamber to cause the movable wall to move in a direction to apply the output force to the output member.

The electrically operated actuator valve incorporates an electric-magnetic device to which is applied from the electronic control module the positive or negative potential or the A.C. output which has a variable mark space ratio characteristic.

With the current off the electro-magnetic device may assume a neutral position in which the chambers in the housing in opposite sides of the movable wall are isolated from each other. Alternatively, with the current off, the electro-magnetic device may be adapted to assume a position in which fluid maintains the booster in either a balanced or "off" position. The electro-magnetic device can be induced into a position in which the booster is in a balanced position by subjecting the electro-magnetic device to an electrical potential. By increasing the potential by a further increment subjects the electro-magnetic device to an increased individual current and into a condition in which the booster is placed in an "on" condition. Thus application of a voltage to the electro-magnetic device places the booster in a balanced condition in which the chambers on opposite sides of the movable wall are subjected to equal fluid pressures, and the application of a further or increased voltage places the booster in the isolated and "on" condition.

The electrically operated actuator valve may have a single digital on-off or amplitude sensitive (analogue) characteristic.

One embodiment of our invention is illustrated in the accompanying drawings which is a schematic layout of a braking system embodying our invention.

In the braking system illustrated in the drawings brakes on four wheels of a vehicle are applied by means of a combined vacuum suspended booster and master cylinder assembly comprising an hydraulic master cylinder 1 and a booster 2. The booster 2 comprises a substantially sealed housing 3 in which is located a movable wall 4 in the form of a piston or flexible diaphragm which divides the housing 3 into a forward constant pressure chamber 5 and a rear variable pressure chamber 6. The wall 4 acts on the piston of the master cylinder 1 through a force output member 7, and a pedal 8 acts on the movable wall 4 through a force input member 9.

Normally the two chambers 5 and 6 are subjected to a source of vacuum, conveniently the inlet manifold of the engine of the vehicle, through a normally open electro-magnetically operated actuator valve 10 which is connected to the manifold through a pipe-line 11.

A load cell 12 sensitive to compression or extension loads applied to the input member 9 and a load cell 13 sensitive to compression or extension loads applied to the output member 7, are both connected to an electric control module 14. Each load cell 11 has an electrical resistance characteristic which changes when subjected to the loading in the member with which it is associated, and the control module 14 compares the relative changes in the electrical characteristics to switch out a neutral potential to a positive or negative potential to energise the electro-magnet of the actuator valve 10. Energisation of the electro-magnet is operated to isolate the chambers 5 and 6 from each other, and admit atmospheric air into the chamber 6 through an inlet 16 to energise the booster causing the movable wall 4 to be advanced and actuate the master cylinder 1 through the force output member 7. Pressurised hydraulic fluid is then delivered to hydraulic actuators of the wheel brakes through a pipe-line 15 connected to the pressure space of the master cylinder 1.

Manually operable means may be incorporated for determining the ratio at which the control module 14 is operative to actuate the valve 10, and for determining the limits within which the actuator 10 will not be energised by the control module 14. Thus our invention may be used with any booster with any desired boost ratio compatable with the requirements of the braking system in which it is to be incorporated.

I claim:

1. A fluid-pressure operated booster for use in a braking system comprising a housing, a movable wall in said housing, means for applying differential fluid pressures across said movable wall, an input member connected to said movable wall, an output member connected to said movable wall a first force sensitive means sensing a force applied to said input member, a second force sensitive means for sensing a force induced in said output member, an electronic control module adapted to compare signals received from said first and second force sensitive means and adapted to emit an output signal, and an electrically-operated actuator valve energised in response to said output signal to establish a pressure differential across said wall and to vary the said pressure differential in accordance with variations in said forces sensed by said force sensitive means.

2. Means as claimed in claim 1, wherein said actuator valve is energised to operate said booster when the difference between said signals exceeds a predetermined value.

3. Means as claimed in claim 1, wherein each force sensitive means comprises at least one load cell having an electrical resistance characteristic which is adapted to change in response to a mechanical load applied to said member with which that load cell is associated.

4. Means as claimed in claim 1, wherein said electronic control module is adapted to compare the relative changes in the electrical resistance characteristics of said first and second force sensitive means.

5. Means as claimed in claim 4, wherein said electronic control module is adapted to switch out a neutral (in balance) potential to a positive or negative potential to energise said electrically operated actuator valve.

6. Means as claimed in claim 4, wherein said electronic control module is adapted to emit an A.C. output to energise said electrically operated actuator valve.

7. Means as claimed in claim 1, in which said electronic control module is adapted to establish electronically between said first and second force sensitive means, a ratio at which the electronic control module will energise said actuator valve.

8. Means as claimed in claim 1, wherein said electronic control module is adapted to maintain limits within which said actuator valve will not be energised by said control module.

9. A fluid-pressure operated booster as claimed in claim 1, incorporating an hydraulic master cylinder adapted to be actuated by said output member.

10. A fluid-pressure operated booster as claimed in claim 1, wherein each force sensitive means comprises a load-conscious sensing device located on said member.

* * * * *